March 3, 1964   A. DE ANGELIS   3,122,962
RING-LIKE RETAINING DEVICES
Filed Feb. 18, 1960   2 Sheets-Sheet 1
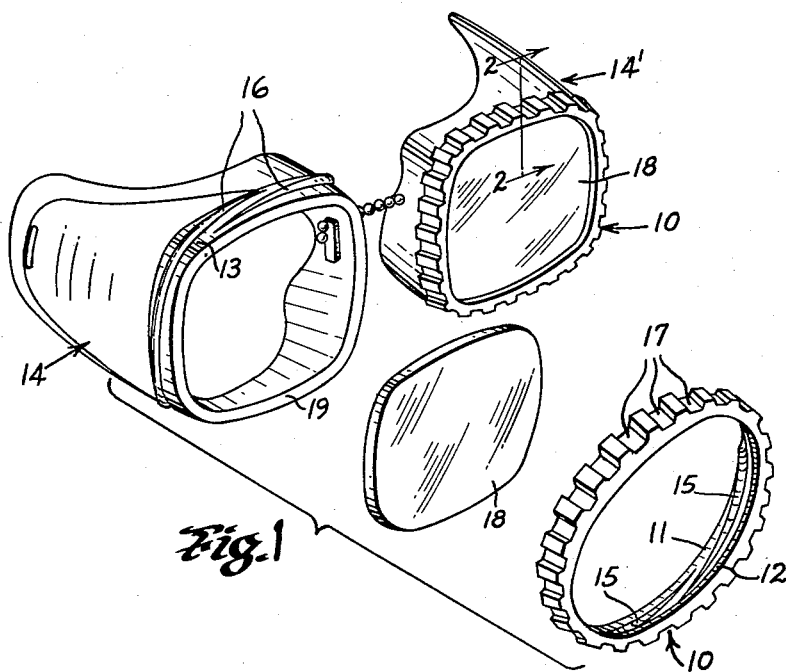
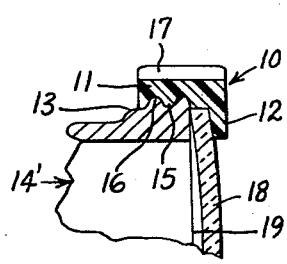
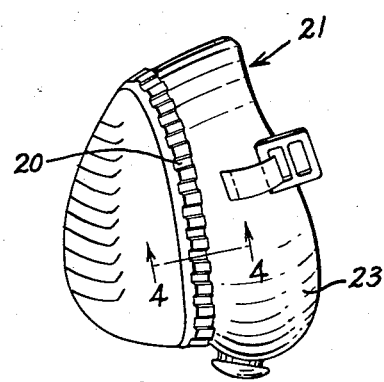
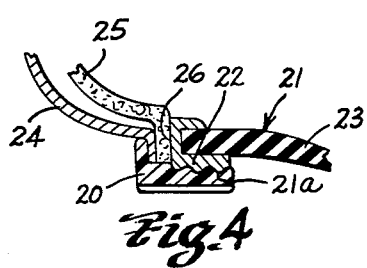
INVENTOR
ARMAND DEANGELIS
BY
*Louis L. Gagnon*
ATTORNEY March 3, 1964   A. DE ANGELIS   3,122,962
RING-LIKE RETAINING DEVICES
Filed Feb. 18, 1960   2 Sheets-Sheet 2
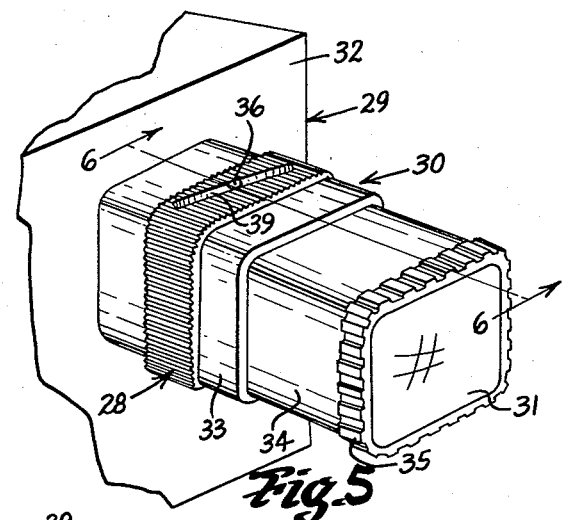
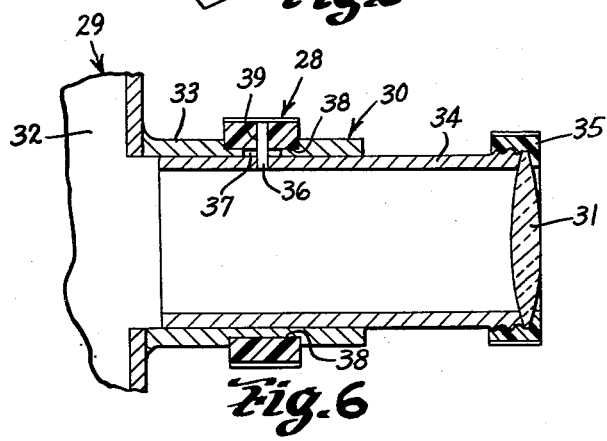
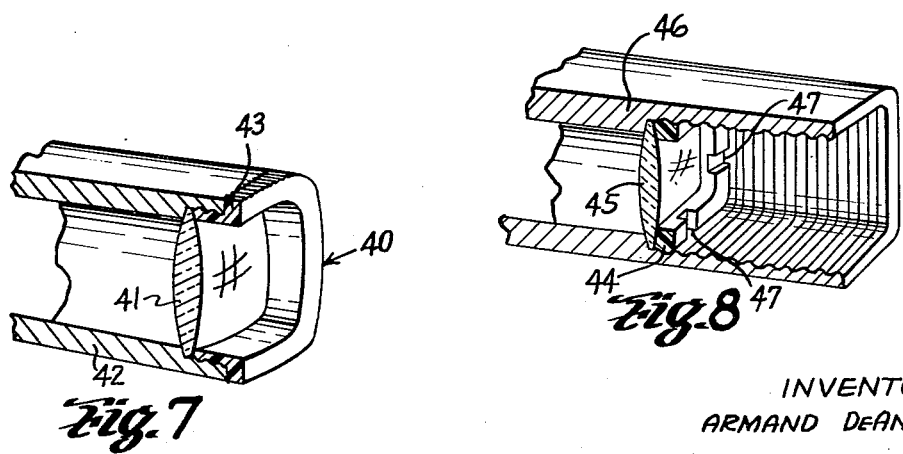
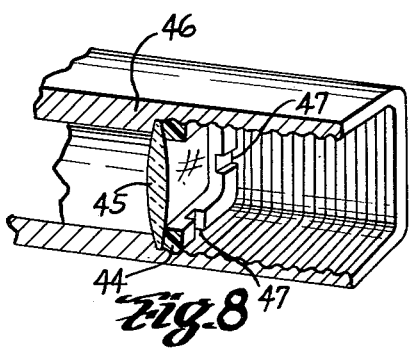
INVENTOR
ARMAND DeANGELIS
BY
*Louis L. Gagnon*
ATTORNEY

United States Patent Office 3,122,962
Patented Mar. 3, 1964

3,122,962
RING-LIKE RETAINING DEVICES
Armand De Angelis, Southbridge, Mass., assignor to American Optical Company, Southbridge, Mass., a voluntary association of Massachusetts
Filed Feb. 18, 1960, Ser. No. 9,640
2 Claims. (Cl. 85—1)

This invention relates to ring-like retaining devices of the screw-type for use as securing and/or adjustment means for forming assemblies of articles embodying a plurality of separable elements and has particular reference to retaining devices of the above character which are readily conformable to different contour shapes and are universally adaptable to rigid receiving articles having various different contours.

A principal object of the invention is to provide improved threaded ring-like retaining devices of the above character which are of a flexible nature and are readily conformable to different desired contour shapes.

Another object is to provide retaining devices of the above character which, by virtue of their deformability of contour, are universally adaptable for use as connecting and retaining means in the making of assemblies of a plurality of separable elemnets having either circular, oval, rectangular or other cross-sectional contours.

Another object is to permit, by the provision of novel flexible ring-like devices of the above character, a redesigning of the usual circular contour shapes of the threaded receiving parts of articles employing the use of threaded ring-like retainers in their assembly.

A further object is to provide simple, highly efficient and inexpensive screw-type retaining devices of the abovementioned flexible character.

Other objects and advantages of the invention will become apparent from the following description when taken in conjunction with the accompanying drawings in which:

FIG. 1 is a perspective view of a goggle with parts thereof shown in exploded fashion to illustrate a particular adaptation of one form of the invention;

FIG. 2 is an enlarged fragmentary cross-sectional view taken approximately on line 2—2 of FIG. 1 looking in the direction indicated by the arrows;

FIG. 3 is a perspective view of a respirator embodying, as a part of its assembly, another form of the invention;

FIG. 4 is an enlarged fragmentary cross-sectional view taken approximately on line 4—4 of FIG. 3 looking in the direction indicated by the arrows;

FIG. 5 is a fragmentary perspective view of apparatus embodying, as a part of its assembly, a different form of the invention;

FIG. 6 is a longitudinal cross-sectional view taken substantially along line 6—6 of FIG. 5 looking in the direction indicated by the arrows;

FIGS. 7 and 8 are fragmentary perspective views, shown partially in cross-section, of further modifications of the invention.

Referring more particularly to the drawings wherein like characters of reference designate like parts throughout the several views, there is shown in FIGS. 1 and 2 a preferred form of the invention which comprises a screw-type ring 10 formed of a durable but relatively flexible material such as nylon or other suitable plastics or rubber compositions or thin ductile metallic materials or the like. The ring 10 which is formed to an initial circular contour (see FIG. 1) is provided with an internally threaded body section 11 and an inwardly directed relatively thin peripheral flange 12 adjoining the internally threaded section 11 (see FIG. 2). The internally threaded body section 11 of the ring 10 is of a preselected inside pitch diameter substantially equal to or slightly greater than that of the average pitch diameter of the externally threaded body portion 13 of an article such as the goggle eyecup 14 (FIGS. 1 and 2) which is to ultimately threadedly receive the ring 10. In the arrangement illustrated in FIGS. 1 and 2, the ring 10 is provided with internal or female threads 15 of a preselected depth and helix angle such as to match and mate with the male or external threads 16 on the goggle eyecup 14 which are of known helix angle and height of protrusion above the body portion 13. Threads on ring 10 normally have a root diameter which is uniform and less than the maximum diametral distance between the roots of the threads on body portion 13 of eyecup 14 and greater than the minimum diametral distance between the crests of the threads on body portion 13 of eyecup 14. It should be understood, however, that should an article such as 14 be provided with thread-like grooves in place of the externally protruding threads 16, the ring 10 would then be provided with protruding internal threads to replace the recessed internal threads 15. In all cases, the inner perimeter of the internally threaded portion of ring 10 is substantially equal to the outer perimeter of the externally threaded portion of eyecup 14 at corresponding locations on respective threaded portions.

The ring 10 is preferably formed of nylon or a similarly characterized material which is relatively stable as to its dimensional characteristics, particularly throughout the cross-sectional areas of its threaded part while being easily deformable, as a whole, in contour shape. Thus, when applying the ring 10 to an article such as the goggle eyecup 14 having a receiving portion 13 of a shape other than circular, the general contour of the ring 10 is deformed by applying lateral pressures thereto with one's fingers so as to shape the same substantially to the contour of the article 14. After having done so, the ring 10 is slipped onto the receiving portion 13 of the article 14 to the point where the respective threads 15 and 16 engage each other. Rotation of the ring 10 in the proper direction will then produce a threading together of the adjoining parts and advance the ring 10 to a desired position of use on the eyecup 14.

In order to render the ring 10 relatively easily deformable as to its general contour by the pressure of one's fingers and to further provide gripping means to assist in rotating the ring when placed on the goggle eyecup 14, the outer peripheral edge of the ring 10 is serrated, as illustrated, or it may be knurled to a predetermined depth toward the internal threads 15 thereof. The thinning of the body section 11, at each of the serrations 17, renders the ring 10 more flexible. However, the depth of the serrations 17 must be controlled in accordance with the nature of the material from which the ring 10 is formed to avoid the possibility of causing a fracturing of its body section 11 when shaping or deforming the ring.

From the above, it can be seen that a retaining ring such as 10 is adaptable to articles of various different contour shapes. However, inner and outer perimeters of respective threaded portions of the ring and article to receive the same must be substantially equal at corresponding locations on said threaded portions.

Goggle eyecups of the type employing screw-type lens retaining rings can, in accordance with this invention, be formed to any desired contour shape such as that shown in FIG. 1, for example, which provides the wearer with a wider field of vision in lateral directions than would be posible with the more conventional circular shapes. In making the goggle assembly shown in FIG. 1, a lens 18 which is selected to have an outer contour shape and size similar to that of the eyecup 14 is rested against the forward edge 19 of the eyecup and the retaining ring 10 is placed over the lens 18 and portion 13 of the eyecup 14 by shaping the same with one's fingers as just described. The ring 10 is then rotated in the proper direction to cause it to threadedly advance along the portion 13 and position its flanged portion 12 firmly against the forward peripheral edge of the lens 18, as shown in FIG. 2, to clamp the lens 18 securely in place. As viewed in FIGS. 1 and 2, the right-hand eyecup 14' of the goggle is shown as being completely assembled and the left-hand eyecup 14 is shown as being dis-assembled for purposes of illustration, it being understood that both of the eyecups 14 and 14' are substantially identical.

In FIGS. 3 and 4, there is shown a modification of the invention wherein a deformable retaining ring 20, which is similar in all respects to the ring 10, is used to provide means for making an assembly of the various separable parts of a respirator 21. The ring 20, in this instance, is provided with a pitch diameter at its internally threaded portion 21a which is approximately equal in circumferential dimension to the average pitch diameter of the rigid irregularly shaped externally threaded receiving part 22 of the face-engaging section 23 of the respirator. In making the respirator assembly with the ring 20, the outer rigid louvered shield section 24 and the filter cartridge 25 are placed against the forward edge 26 of the receiving part 22 of the respirator section 23, as shown in FIG. 4. The ring 20, which is normally circular in shape is next deformed by applying the pressure of one's fingers to shape the same to approximately the contour of the receiving part 22 whereupon it is slipped into place on the part 22 over the shield section 24. Rotation of the ring 20 in the proper direction will cause the ring 20 to advance along the threaded receiving section 22 of the respirator and clamp the section 24 and filter cartridge 25 securely in place in a manner identical to that described above with relation to the assembly embodying the lens 18, goggle eyecup 14 and retaining ring 10.

A still further modification of the invention is shown in FIGS. 5 and 6 wherein a flexible ring-like member 28 formed of nylon or other suitable flexible plastic material or rubber compositions is provided as a part of the assembly of an adjustable focusing mechanism for optical image projection devices or the like. The projection device, which is generally indicated by reference numeral 29 and shown diagrammatically for purposes of illustration, may be in the form of a camera, slide or movie projector or telescope or any one of a variety of instruments or devices of the type embodying a tubular projection unit 30 requiring a sliding telescopic adjustment for selectively positioning a lens element 31 or the like at various desired distances from conventional fixed optical receiving and/or projecting elements (not shown) which would be located within the main supporting section 32 of the projection device 29.

The tubular projection unit 30 embodies an outer stationary tubular part 33 fastened at one of its ends to the main supporting section 32 of the device 29 by a weld connection or the like, as shown in FIG. 6. Within the part 33, there is slidably fitted an adjustable tubular part 34 having an outer contour shape approximately matching that of the inner contour of the part 33 and being longitudinally slidable within said part 33 in telescoping fashion. The outer end of the adjustable tubular part 34 is provided with a lens element 31 or the like mounted thereon preferably by means of a retaining ring 35 which is substantially identical in construction and function to the above-discussed rings 10 and 20. Thus, it can be seen that by a sliding adjustment of the tubular part 34 in the part 33, the lens elements 31 can be moved away from or toward the main supporting section 32 of the device 29. In order to provide means for bringing about a fine adjustment of the tubular part 34, a pin 36 is secured in the part 34 and extends outwardly of the tubular part 33 through a slot 37 therein preferably of a width approximately equal to the diameter of the pin 36 and of a length sufficient to permit a desired extent of longitudinal adjustment of said tubular part 34. The flexible ring-like member 28 is fitted around the stationary tubular part 33 in a circumferential recess 38 provided therefor so as to overlie the slot 37, as shown in FIG. 6. In the ring-like member 28, there is provided a helical slot 39 of a width approximately equal to the diameter of the pin 36 and the pin 36 is of such a length as to extend up through the helical slot 39, as shown in FIGS. 5 and 6. Rotation of the ring-like member 28 in one direction around the tubular part 33 will cause a forward movement of the pin 36 by the threading effect of the helical slot thereon and thereby move the tubular part 34 in a direction outwardly of the stationary tubular part 33. Rotation of the ring-like member 28, in an opposite direction to that just mentioned, will, in a similar manner, cause the part 34 to telescope into the part 33. The ring-like member 28 is preferably serrated, as illustrated, or knurled on its exposed outer side to provide a roughened finger-gripping area and thus render the same more easily rotatable. It is pointed out that the helical slot 39 need not be extended completely through the ring-like member 28 if it is desired to conceal the slot 39 and pin 36. This may be accomplished by shortening the pin 36 so as to allow the same to extend only part way into the ring-like member 28. The helical slot 39 would then be formed as an internal thread-like groove of a depth sufficient only to receive the shortened pin 36.

A still further modification of the invention embodies an externally threaded flexible ring-like retaining member 40 (see FIG. 7) which is deformable as to outer contour shape and may be used as lens securing means or the like in instances where a lens such as 41, for example, is to be supported internally of a rigid tubular member 42 of any desired non-circular inner contour shape. The ring-like retaining member 40 may or may not be provided with the outwardly flanged section 43 which is shown in FIG. 7.

In FIG. 8, an externally threaded retaining ring 44 without a flanged outer section is shown in a position of use as means to hold a lens element 45 in a desired position deep within an internally threaded rigid tubular support 46. The retaining ring 44, in this case, is provided with slotted areas 47 which may be used to receive a spanning type of tool or the like to rotatably adjust the ring 44 when in the tube 46.

It is pointed out that both of the retaining rings 40 and 44 are dimensionally controlled as to thread sizes and diameters in the manner discussed hereinabove with relation to the ring 10 and while being initially circular in shape are readily conformable in outer contour to irregularly shaped internally threaded tubular receiving members such as 42 or 46.

It should be understood that threaded-ring-like retaining devices of the above-described character may be formed to an initial specific contour shape other than circular if it is so desired. That is, by molding or other conventional methods of manufacturing plastic articles, the retaining devices may be formed to contour shapes approximating that of the rigid receiving portions of the specific articles to which they are to be applied. In such cases, the retaining devices would not require preshaping at the time of their application to said receiving articles. In view of their flexible nature, however, rotation of such devices, once applied to a threaded receiving portion of a rigid article, would produce a desired screwing-on of the retaining devices. It is pointed out that it is only because of the flexible nature of the retaining devices of this invention that a threading action can be so accomplished on rigid receiving articles of contour shapes other than circular.

From the foregoing, it will be seen that simple, efficient and economical means have been provided for accomplishing all of the objects and advantages of the invention. Nevertheless, it is apparent that many changes in the details of construction and arrangement of parts may be made without departing from the spirit of the invention Having described my invention, I claim:

1. In combination, an article having a rigid end portion, external threads on said end portion arranged about an axis thereof, said end portion being of non-circular cross-sectional shape in planes through said threads perpendicular to said axis so as to have maximum and minimum diameters in said planes, and a deformable ring-like retaining member having an internally threaded portion, said member being circular and having a thin walled, highly flexible, circumferentially continuous body portion of dimensionally stable plastic material, said body portion having an inside diameter many times the maximum wall thickness of said body portion, the inner perimeter of said internally threaded portion being substantially equal to the outer perimeter of said externally threaded portion at corresponding locations on said respective threaded portions, the threads on said member normally having a root diameter which is uniform and less than the maximum diametral distance between the roots of the threads on said end portion and greater than the minimum diametral distance between the crests of the threads on said end portion, said threaded portions being constructed and arranged to mate upon deformation of said circular member to assume said non-circular shape upon screwing together of said end portion and said member.

2. In combination, an article having a rigid end portion, external threads on said end portion arranged about an axis thereof, said end portion being of non-circular cross-sectional shape in planes through said threads perpendicular to said axis so as to have maximum and minimum diameters in said planes, a plate having a non-circular shape substantially congruent to the shape of said end portion and lying in abutting relation thereto, said plate having dimensions in said planes less than the root diameters of the threads in said planes and a deformable, ring-like retaining member having an internally threaded portion threadedly engaged upon said end portion of said article for holding said plate against said end portion of said article, said member being initially circular and having a thin walled, highly flexible, circumferentially continuous body portion of dimensionally stable, plastic material and in inwardly directed flange at one end for engaging said plate, said body portion having an inside diameter many times the maximum wall thickness of said body portion, the inner perimeter of said internally threaded portion being substantially equal to the outer perimeter of said externally threaded portion at corresponding locations on said respective threaded portions, the threads on said member normally having a root diameter less than the maximum diametral distance between the roots of the threads on said end portion and greater than the minimum diametral distance between the crests of the threads on said end portion, said threaded portions being constructed and arranged to mate upon deformation of said circular member to assume said non-circular shape upon screwing together of said end portion and said member whereby said plate is held in position against said rigid end portion.

References Cited in the file of this patent

UNITED STATES PATENTS

| | | |
|---|---|---|
| 1,100,630 | Toepperwein | June 16, 1914 |
| 1,157,574 | Mueller | Oct. 19, 1915 |
| 1,788,277 | Cornell | Jan. 6, 1931 |
| 1,883,673 | Fouquet | Oct. 18, 1932 |
| 2,233,270 | Ruhl | Feb. 25, 1941 |
| 2,309,832 | Dockson et al. | Feb. 2, 1943 |
| 2,390,103 | Johnson | Dec. 4, 1945 |
| 2,437,843 | Van Ness | Mar. 16, 1948 |
| 2,804,623 | Hirschmann | Sept. 3, 1957 |
| 2,827,925 | Meibaum | Mar. 25, 1958 |
| 2,871,034 | Wiltse | Jan. 27, 1959 |
| 2,900,435 | Curtiss | Aug. 18, 1959 |
| 2,960,353 | Woodling | Nov. 16, 1960 |

FOREIGN PATENTS

| | | |
|---|---|---|
| 1,377 | Great Britain | of 1893 |
| 420,780 | Great Britain | Dec. 7, 1934 |
| 1,194,927 | France | May 11, 1959 |